(12) United States Patent
Beier et al.

(10) Patent No.: US 8,702,179 B2
(45) Date of Patent: Apr. 22, 2014

(54) VEHICLE BRAKE SYSTEM

(75) Inventors: Peter Beier, Wunstorf (DE); Henning Förster, Nordstemmen (DE); Hartmut Rosendahl, Hannover (DE); Gerhard Bruns, Hannover (DE); Olaf Jantz, Hannover (DE); Wolfgang Strache, Hemmingen (DE)

(73) Assignee: WABCO GmbH, Hannover (DE)

( * ) Notice: Subject to any disclaimer, the term of this patent is extended or adjusted under 35 U.S.C. 154(b) by 847 days.

(21) Appl. No.: 12/317,704

(22) Filed: Dec. 23, 2008

(65) Prior Publication Data

US 2009/0189438 A1   Jul. 30, 2009

(30) Foreign Application Priority Data

Jan. 7, 2008 (DE) .................. 10 2008 003 380

(51) Int. Cl.
*B60T 13/74* (2006.01)

(52) U.S. Cl.
USPC ........... 303/3; 303/15; 303/114.1; 303/118.1; 303/140; 303/151; 303/155; 303/191; 180/281; 180/282; 188/1.11 E; 188/1.11 L; 188/1.11 R; 188/72.2; 188/140 R; 188/156; 188/322.13; 701/70; 701/78

(58) Field of Classification Search
CPC ....... B60T 8/00; B60T 8/4872; B60T 8/4275; B60T 8/4881; B60T 8/4827; B60T 8/341; B60T 8/441; B60T 8/446; B60T 13/665; B60T 13/586; B60T 13/686; B60T 13/683; B60T 13/66; B60T 13/58; B60T 13/145; B60T 13/146
USPC .............................. 303/3, 113.2, 152; 188/381
IPC ....................................................... F16D 65/20
See application file for complete search history.

(56) References Cited

U.S. PATENT DOCUMENTS

| 5,390,992 | A | | 2/1995 | Walenty et al. |
| 5,462,342 | A | * | 10/1995 | Goebels ..................... 303/113.2 |
| 5,573,312 | A | * | 11/1996 | Muller et al. ..................... 303/3 |
| 5,615,933 | A | * | 4/1997 | Kidston et al. ................ 303/152 |
| 6,059,379 | A | * | 5/2000 | Deml et al. ..................... 303/15 |
| 2004/0135432 | A1 | * | 7/2004 | Reuter et al. .................. 303/152 |
| 2007/0170774 | A1 | * | 7/2007 | Gerum et al. ................... 303/20 |
| 2007/0188018 | A1 | * | 8/2007 | Reuter et al. ............... 303/114.1 |
| 2007/0260385 | A1 | * | 11/2007 | Tandy et al. .................... 701/70 |
| 2007/0262637 | A1 | * | 11/2007 | Bennett ............................ 303/3 |

FOREIGN PATENT DOCUMENTS

| DE | 196 22 017 A1 | 12/1996 |
| EP | 1 352 799 A2 | 10/2003 |
| EP | 1 785 324 A1 | 5/2007 |
| JP | 2002067909 A | 3/2002 |

\* cited by examiner

*Primary Examiner* — Robert A Siconolfi
*Assistant Examiner* — San Aung
(74) *Attorney, Agent, or Firm* — Kramer Levin Naftalis & Frankel LLP (57) ABSTRACT

A brake system for a vehicle includes brake cylinders operated by pressurized fluid for actuation of brakes by means of pressurized fluid on at least one first axle of the vehicle. The brakes on at least one other, second, axle can be actuated exclusively electromechanically in response to an electrical braking request signal. The pressure of the pressurized fluid can be modulated indirectly or directly and the electrical braking request signal can be generated indirectly or directly in response to actuation of a brake pedal of a brake pedal device. A service brake function is provided by means of hybrid use of the brakes on the first axle(s) together with the brakes on the second axle(s). The brake cylinders operated by pressurized fluid are pneumatically operated brake cylinders. The pressure modulated by the brake pedal device is a pneumatic pressure, and the pressurized fluid is compressed air.

20 Claims, 4 Drawing Sheets

VEHICLE BRAKE SYSTEM

FIELD OF THE INVENTION

The present invention generally relates to an improved vehicle service brake system.

BACKGROUND OF THE INVENTION

Conventional vehicle brake systems of the general type under consideration include hybrid systems in which the application energy for actuating the vehicle brakes is provided in two ways. The brakes on at least a first axle of the vehicle are equipped with brake cylinders operated by pressurized fluid, and can be actuated by the brake cylinders so that the application energy is supplied via pressurized fluid. In contrast, the brakes on at least one other axle of the vehicle can be actuated exclusively electromechanically, and, so, the application energy of these brakes is supplied electromechanically.

Conventional electro-pneumatic or pneumatic brake systems typically provide the application energy for actuation of vehicle brakes in a single way. The brake cylinders can all be actuated electro-pneumatically or pneumatically. Pneumatic pressure can be modulated and, if necessary, a braking request signal can be generated by means of a brake pedal device. According to the braking request signal that may be present, pressure can also be modulated by means of a valve unit. A modulated pressure can be amplified by means of relay valves and supplied to the pneumatically operated brake cylinders for actuation of the brakes. For this purpose, conventional electro-pneumatic or pneumatic brake systems are typically equipped with two brake circuits operated by pressurized fluid, each of which can be supplied with compressed air from a compressed air reservoir tank. The compressed air reservoir tanks are in communication with the valve unit and the pneumatically operated brake cylinders via compressed air lines.

In these known service brake systems, a parking brake can typically be applied to at least one rear axle of the vehicle. For this purpose, the brake cylinders on the brakes of this rear axle are equipped with spring actuators. In the unpressurized condition of the spring-actuated brake cylinders, the parking brake is applied by means of the spring actuators. For driving operation, the parking brake must be released. For this purpose, compressed air can be admitted to the spring actuator part of the spring actuator brake cylinders by establishing communication with one of the compressed air reservoir tanks.

A disadvantage of these conventional electro-pneumatic or pneumatic brake systems is that they are equipped with pneumatically operated brake cylinders on all brakes. These pneumatically operated brake cylinders can be supplied with compressed air via two compressed air circuits. Thus, many expensive components need to be incorporated into such service brake systems. In addition, the complexity of the tubing is great. This leads to high installation costs and to increased susceptibility to faults due to possible leaks in the compressed air lines. Maintenance time and effort as well as down times resulting therefrom also contribute to high costs.

Hybrid systems are more cost-effective than conventional hydraulic or pneumatic brake systems. In particular, hybrid systems are equipped on at least one vehicle axle with comparatively inexpensive electromechanical brake actuating devices, without the need for comparatively more expensive brake cylinders operated by pressurized fluid. A hybrid brake system is described in JP 2002-067909 and includes hydraulically actuatable brake cylinders on a first group of wheels and electromechanical brake actuating devices on a second group of wheels. In this case, the wheels of the first group are typically wheels of a front axle, whereas the wheels of the second group are typically wheels of a rear axle.

Two mutually independent pressure circuits are used for the brakes on the left front wheels and for the brakes on the right front wheels. The hydraulic pressure that can be modulated by means of a brake pedal device can be amplified by means of valve units and supplied to hydraulically-operated brake cylinders.

The pressure modulated in the hydraulic brake circuits is measured. In addition, wheel rotational speeds as well as the torques of motors of electromechanical brake actuating devices are sensed by means of sensors. The electromechanical brake actuating devices are controlled using the sensor data. For this purpose, the measured value of the modulated hydraulic pressure of the right front vehicle wheel is used to control the electromechanical brake actuating device for the left rear wheel. At the same time, the modulated hydraulic pressure for the hydraulically actuatable brake of the left front wheel is used to control the electromechanical brake actuating device for the right rear wheel. This crosswise logical combination of front brakes and rear brakes prevents failure of all brakes on one side of the vehicle in the event of failure of one brake circuit.

According to JP 2002-067909, the electromechanically actuatable brakes are not actuated if the vehicle is moving at very low speed, if the vehicle is at a standstill or if a parking function of the vehicle is activated. As a result, electrical energy is conserved.

The known hybrid brake systems are all equipped with a combination of hydraulically actuatable brake cylinders for braking wheels on at least one (front) axle of the vehicle as well as with electromechanical brake actuating devices on at least one other axle (see e.g., the hybrid brake systems disclosed in EP 1352799 A2, U.S. Pat. No. 5,390,992, DE 19622017 A1 and EP 1785324 A1).

JP 2002-067909 discussed above further proposes that the hybrid brake system also be used for a vehicle train including a tractor and a trailer. This is largely non-problematic if the trailer is equipped with electromagnetically actuatable brake actuating devices. However, many trailers are equipped with brake cylinders operated by pressurized fluid. A tractor should therefore be capable of forming a vehicle train and braking it safely even with a trailer equipped with brake cylinders operated by pressurized fluid. Restriction to the use of trailers having brake actuating devices that are actuatable exclusively by electromechanical means is usually not desired—a tractor should be capable of being coupled with different trailers.

The use of a hydraulic brake circuit with a trailer has the disadvantage, however, that hydraulic fluid can escape while the trailer is being coupled or uncoupled. Escaped hydraulic fluid can pollute the environment and should therefore be collected and professionally disposed of. Moreover, any loss of hydraulic fluid must be replaced. Hydraulic fluid is already expensive, and the associated time and effort for maintenance can also be costly.

The known hybrid service brake systems, while more cost-effective than conventional service brake systems operated purely by pressurized fluid, nevertheless are less suitable for use in a vehicle to which it must be possible to couple a trailer in flexible manner.

SUMMARY OF THE INVENTION

Generally speaking, in accordance with the present invention, an improved vehicle service brake system is provided which overcomes disadvantages associated with conventional service brake systems.

The vehicle brake system in accordance with embodiments of the present invention includes pneumatically operated brake cylinders for actuation of brakes, by means of compressed air, on at least one first axle of the vehicle. The brakes on at least one second axle of the vehicle can be actuated exclusively electromechanically in response to an electrical braking request signal. The pneumatic pressure of the compressed air can be modulated indirectly or directly and the electrical braking request signal can be generated indirectly or directly in response to actuation of a brake pedal of a brake pedal device. The service brake function can be provided by means of hybrid use of the brakes on the first axle(s) together with brakes on at least one other (second) axle of the vehicle.

As the pneumatically operated brake cylinders can be actuated pneumatically by means of compressed air, they are hereinafter referred to as pneumatically actuatable brake cylinders. This is regardless of whether the pneumatic pressure is modulated pneumatically or electro-pneumatically.

Compressed air for a trailer having pneumatically actuatable brake cylinders can be supplied by the inventive brake system, since a pneumatic system with compressed air is already present. The inventive brake system can therefore be used flexibly for various commercial vehicles. In particular, it is suitable for use in tractors to which a trailer can be coupled. It can also be used, however, in vehicles to which no trailer can be coupled (e.g., buses). In particular, it is advantageous to use identical components for different commercial vehicles, regardless of whether a trailer can be coupled thereto or whether the option of coupling a trailer is not provided. This means that larger numbers of units can be produced, and so the manufacturing cost of individual components and, thus, the cost of the brake system on the whole can be reduced.

By virtue of using a brake system constructed as a hybrid system, the need for pneumatically operated brake cylinders on at least one axle of the vehicle is obviated. In particular, brakes on at least one axle of the vehicle can be actuated exclusively by electromechanical means. Electromechanical brake actuating devices are more cost-effective than pneumatically operated brake cylinders. The inventive brake system reduces the number of built-in expensive components and saves costs.

The inventive brake system additionally offers high operating safety. For example, if either the pneumatic mode of actuation or the electromechanical mode of actuation of the brakes fails, a vehicle can still be braked and brought to a standstill via the respective other mode of actuation.

Accordingly, it is an object of the present invention to provide an improved service brake system for braking a vehicle that is both cost-effective—more so than conventional hybrid, service brake systems—and safe.

It is also an object of the present invention to provide an improved service brake system for braking a vehicle that can be used in a tractor to which there can be coupled, in flexible manner, a trailer having brake cylinders that are operated by pressurized fluid and are actuatable from, the tractor.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

The present invention provides embodiments of an improved vehicle service brake system employing pneumatically actuatable brake cylinders. The system in accordance with embodiments of the present invention is a hybrid system—obviating the need for pneumatically operated brake cylinders on at least one axle of the vehicle. In particular, brakes on at least one axle of the vehicle can be actuated exclusively by electromechanical means.

According to one embodiment of the inventive vehicle service brake system, the brakes on one or more first axles of the vehicle have two modes of actuation. In the first mode of actuation, these brakes can be actuated by means of the pneumatically actuatable brake cylinders. In the second mode of actuation, these brakes can be actuated electromechanically. These brakes can be actuated by means of both modes of actuation together or by means of one of the modes of actuation alone. It should be appreciated that the brakes can, therefore, be controlled flexibly. This is advantageous, particularly, from a safety standpoint, in that, in the event of the failure of one mode of actuation, the brakes can still be actuated via the other mode of actuation.

Preferably, a first axle of the vehicle is provided with a parking brake function, especially, when it is a rear axle. When taken together with a parking brake function that may be provided on one or more other (second) axles, parking safety is increased. In particular, the application of parking brakes on several axles of the vehicle can effectively serve to prevent the parked vehicle from undesirably rolling away. Thus, the vehicle can be parked on steep inclines.

First axle brakes are preferably provided with an electromechanically actuatable parking brake function. Thus, a pneumatically actuatable parking brake function can be omitted. This reduces costs. If the second axle brakes are additionally provided with an electromechanically actuatable parking brake function, the vehicle can be immobilized on several axles even without a pneumatically actuatable parking brake function. As a result, a high degree of safety is achieved in parking the vehicle, and at the same time the costs are reduced.

First axle brakes can also be provided with a pneumatically actuatable parking brake function. When the vehicle is in parked condition, it can be immobilized by this parking brake function alone or with support. Preferably, the at least one first axle is then a rear axle. The second axle brakes can be provided additionally with a parking brake function. In each case, the use of a pneumatically actuatable parking brake function achieves the safety of a proven system for parking the vehicle, which safety is further increased, when necessary, by the use of an electromechanically actuatable parking brake function.

Preferably, the second axle brakes are provided with an electromechanically actuatable parking brake function. As a result, the need to provide a pneumatically actuatable parking brake function on the at least one first axle is obviated. Consequently, regular pneumatically operated brake cylinders can be employed there. Combination spring-actuated brake cylinders are then not needed. Thus, the costs of the brake system can be further lowered. For this purpose, the at least one second axle of the vehicle is preferably a rear axle; nevertheless, it can also be a front axle.

In two embodiments of the inventive brake system, the brake pedal device is equipped with a braking power transmitter. In response to actuation of the brake pedal, a braking request signal can be generated directly by the braking power transmitter. The electromechanically actuatable brakes are actuated indirectly in response to the braking request signal. The pneumatic pressure for actuating the pneumatically actuatable brakes is modulated electro-pneumatically, or, in other words, indirectly, by a valve unit in response to the braking request signal. In addition, the pressure can be pneumatically, or, in other words, directly, modulated in response to actuation of the brake pedal. A pneumatic redundancy circuit of corresponding construction makes it possible, by means of the pneumatically actuatable brake cylinders, to brake a vehicle equipped with the inventive brake system even in the case of failure of the vehicle electronics.

In another embodiment, direct pneumatic modulation of the pressure is not used. Thus, a tubing system having pressurized fluid lines in the driver's cab is not necessary. As a result, the number of compressed air lines is reduced, and the danger of a pressure loss due to leaky compressed air lines is reduced. Also, the costs of the brake system are lowered.

In an alternative embodiment, a braking request signal is generated by a braking power transmitter in response to actuation of the brake pedal—however, a pneumatic pressure is simultaneously modulated by direct pneumatic means. Consequently, the pneumatic pressure for actuation of the pneumatically actuatable brakes is not modulated electro-pneumatically in response to actuation of the brake pedal. As a result, it is possible to dispense with an axle modulator, which would otherwise be used to control electro-pneumatic modulation of the pneumatic pressure. This reduces costs and, at the same time, ensures that the pneumatically actuatable brakes can still be actuated even in the event of failure of the vehicle electronics. In this embodiment, therefore, the inventive brake system can be used advantageously in vehicles that manage without the option of electronically modulating pneumatic pressures, even though they must simultaneously be capable of being braked safely at all times, that is, even in the event of failure of the vehicle electronics.

In a further alternative embodiment of the inventive brake system, the braking power transmitter of the brake pedal device is dispensed with. Consequently, a braking request signal cannot be generated directly in response to actuation of the brake pedal. In this embodiment, a pneumatic pressure is modulated directly upon actuation of the brake pedal. The pneumatically actuatable brake cylinder can be actuated by means of this modulated pneumatic pressure. In this embodiment, the braking request signal is generated indirectly. In particular, the compressed air lines that supply compressed air to the pneumatically actuatable brake cylinders are provided with pressure sensors which measure the pneumatically modulated pneumatic pressure in these lines. A braking request signal can be generated from a measured value of a pressure sensor. The electromechanically actuatable brakes are actuated in response to a braking request signal generated in this way.

In another embodiment of the inventive brake system, a single pressure sensor generates a single braking request signal. In another variant, a braking request signal is generated from the measured values of a plurality of pressure sensors. In a further variant, each of a plurality of pressure sensors generates a braking request signal. All electromechanically actuatable brakes can now be actuated in response to a single braking request signal. In a further variant deviating therefrom, at least one electromechanically actuatable brake can be actuated in response to a first braking request signal and at least one second electromechanically actuatable brake can be actuated in response to a second braking request signal. A plurality of electromechanically actuatable brakes are actuated in response to braking request signals generated by different pressure sensors.

In yet another embodiment of the inventive brake system, both the first axle brakes and the second axle brakes are controlled by a common module. This module can be integrated into the brake pedal device. However, it can also be incorporated into the system as a separate component. By virtue of the combined design compared with controllability of the brakes of a plurality of modules, the need for signal lines between these modules can be obviated. In addition, cost savings resulting from reduced working time and effort can be achieved both in manufacture of the components and in installation.

In a further embodiment of the inventive brake system, the first axle brakes equipped with pneumatically actuatable brake cylinders can be controlled by a first module. In contrast, the second axle brakes that can be actuated exclusively electromechanically can be controlled by a second module. Control of the brakes is therefore distributed between two modules. As a result, operating safety is furthered. In particular, in the event of failure of the electronics on one module, the brakes controlled by the respective other module continue to be controllable. Consequently, the simultaneous failure of all brakes is prevented. In the event of failure of one module, the vehicle can be braked in controlled manner and brought to a standstill with the inventive brake system.

According to a still further embodiment of the inventive brake system, the two existing modules are additionally supplied with electrical energy from two batteries. In particular, one possible cause of failure of the electronics of a module is failure of the energy supply. Because each of the two modules is supplied with electrical energy by its respective battery, the probability that both modules will fail simultaneously is further reduced. Simultaneous failure of the electronic control of all brakes is therefore very improbable.

Preferably, the first module, which controls the first axle brakes having pneumatically operated brake cylinders, is integrated structurally into the brake pedal device. The combined design leads to lower costs. In particular, connecting lines and connecting tubes between the brake pedal device and the first module are not needed. In addition, the time and effort of assembly is reduced by the combined design. Consequently, the costs of assembly are also lowered.

Preferably, electromechanically actuatable brakes are provided with an electromechanical ABS (anti-lock braking system) function—that is, a function by means of which a brake of a locking vehicle wheel can be automatically released. The known safety of an ABS, which is derived from the better controllability of the vehicle during full braking, is therefore also established by electromechanically actuatable brakes. For this purpose, the inventive brake system can be equipped with at least one wheel speed sensor for detecting wheel lock. In contrast to conventional brake systems, however, no additional ABS valve is needed to impart the ABS function to electromechanically actuatable brakes. Thus, further components are not needed, and system costs can be reduced without compromising safety.

Desirably, the ABS function of a brake can be controlled by the same module that controls that brake. In the event of failure of the electronics, the functions combined in one module fail at the same time. If a brake function fails, however, it is also true that an ABS function is no longer necessary. The combined design therefore avoids unnecessary exchange of data between different modules, but in doing so it does not increase the probability of a malfunction of the ABS. By virtue of the implementation of the ABS function of the at least one first axle of the vehicle in the first module and of the at least one second axle in the second module, even the risk that an ABS function could fail completely is reduced.

Preferably, in the inventive brake system, at least one first axle of the vehicle is a front axle, and at least one second axle of the vehicle is a rear axle. To improve upon this preferred embodiment, at least one further first axle that may be present in the vehicle is a rear axle, and at least one further second axle that may be present in the vehicle is a front axle. In particular, it is possible to dispense with pneumatically actuatable brake cylinders for brakes on further front axles that may be present in the vehicle. The use of comparatively low-cost electromechanically actuatable brakes is sufficient in this case. The additional use of pneumatically actuatable brake cylinders on at least one rear axle of the vehicle achieves the advantage that a vehicle equipped with the inventive brake system can be braked by means of pneumatically actuatable brake cylinders both on at least one front axle and also on at least one rear axle of the vehicle. Especially when the brake system is equipped with a pneumatic redundancy circuit, the vehicle can then be braked both by means of brakes on at least one front axle and by means of brakes on at least one rear axle. In addition, pneumatically actuatable brake cylinders on the at least one rear axle can be constructed as combination spring-actuated brake cylinders. A parking brake function can then also be established by means of the at least one further first axle.

In another embodiment of the inventive brake system, at least one first axle of the vehicle is a rear axle, and at least one second axle of the vehicle is a front axle. This has the advantage that a vehicle equipped with the inventive brake system can then be immobilized pneumatically at brakes of at least one rear axle, if the pneumatically actuatable brake cylinders on the at least one rear axle are constructed as combination spring-actuated brake cylinders. To improve upon this embodiment, at least one further first axle that may be present in the vehicle is a front axle, and at least one further second axle that may be present in the vehicle is a rear axle. Consequently, by means of the brakes on the at least one further first axle of the vehicle, the vehicle can be braked with the high braking force that can be supplied by pneumatically actuatable brake cylinders. Further second axles of the vehicle that are equipped with exclusively electromechanically actuatable brakes can be further rear axles, in order to keep the costs of the brake system low.

In another embodiment of the present invention, the brake system can be used in a vehicle train composed of a tractor and a trailer. The vehicle equipped with the inventive brake system is then the tractor. Via two compressed air ports, the brake system supplies the trailer with a reservoir air pressure and a modulated pneumatic pressure for actuation of the brakes of the trailer. In particular, trailer brakes are typically equipped with pneumatically actuatable brake cylinders. The compressed air needed for actuation of these brake cylinders can be supplied easily from the inventive brake system, since this brake system uses compressed air as pressurized fluid in any case.

In yet another embodiment of the present invention, the brake system is also constructed as a brake system for a vehicle train. In addition to, or as an alternative to, the embodiment of the inventive brake system described in the preceding paragraph, the brake system is now equipped with a plug-in port, via which an electrical signal for actuating electromechanically actuatable brakes of the trailer can be supplied to the trailer. Consequently, a trailer equipped with low-cost electromechanically actuatable brakes can be coupled to a vehicle equipped with the inventive brake system. These brakes can be actuated by means of the electrical signal.

Figure 1:
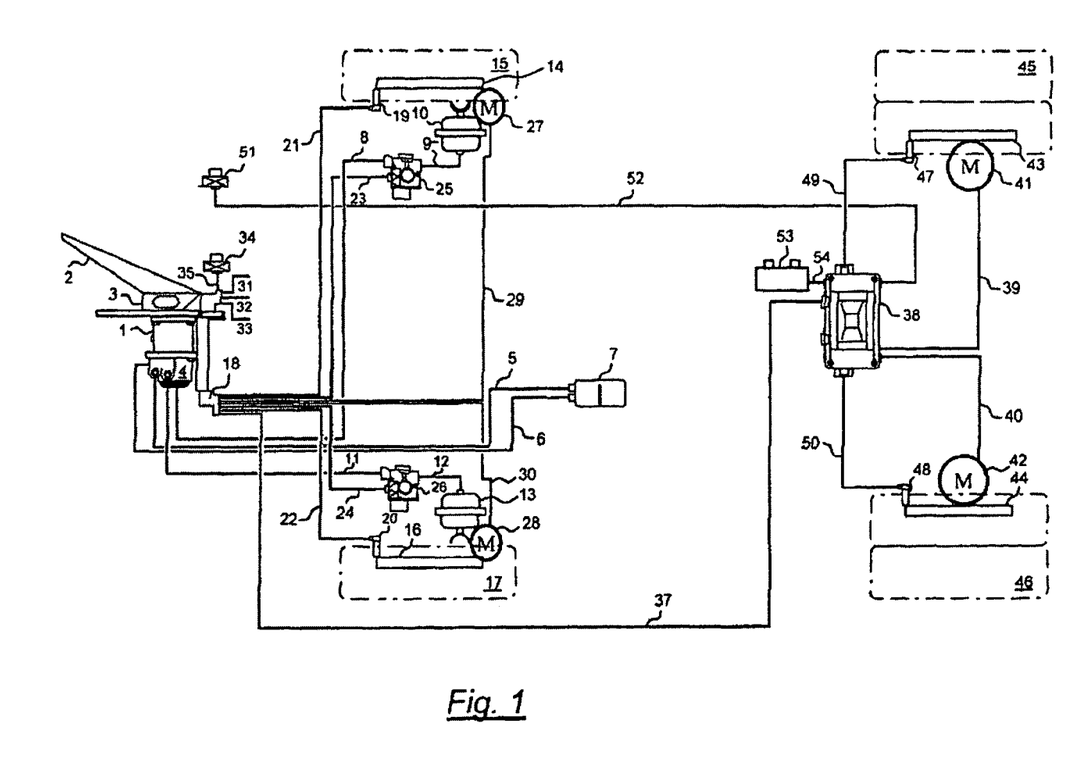
FIG. 1 is a simplified schematic diagram of a hybrid service brake system in accordance with one exemplary embodiment of the present invention having electro-pneumatically (or pneumatically as well as electromechanically) actuatable brakes on the front axle of the vehicle and exclusively electromechanically actuatable brakes on the rear axle of the vehicle.

Referring now to the drawing figures, FIG. 1 schematically shows a first exemplary embodiment of the inventive brake system. Electro-pneumatically, or pneumatically as well as electromechanically, actuatable brakes are provided on the front axle of a vehicle as well as exclusively electromechanically actuatable brakes on the rear axle of the vehicle.

A brake pedal device 1 can be actuated by means of a brake pedal 2. In response to an actuation, a braking request signal can be generated directly by a braking power transmitter 3. Via compressed air lines 5 and 6, a valve unit 4 integrated in brake pedal device 1 of this embodiment is in communication with a compressed air reservoir tank 7.

In response to the braking request signal, the brake system modulates a pressure via valve unit 4. In one variant of this exemplary embodiment, the pressure can be modulated exclusively electro-pneumatically by means of valve unit 4; in another variant the pressure can be modulated exclusively pneumatically by means of valve unit 4. Under certain circumstances, it is then possible to dispense with compressed air lines in the driver's cab of the vehicle. The modulated pressure can be supplied via compressed air lines 8 and 9 to a compressed air brake cylinder 10 and via compressed air lines 11 and 12 to a further compressed air cylinder 13. A brake 14 for braking a front wheel 15 can be actuated by means of compressed air cylinder 10. A brake 16 for braking a further front wheel 17 can be actuated by means of compressed air cylinder 13. A first module 18 is integrated into brake pedal device 1. The brake pressures for compressed air cylinders 10 and 13 can be controlled by means of this module.

Locking of wheels 15 and 17 can be detected by means of wheel speed sensors 19 and 20. In particular, signals of wheel speed sensors 19 and 20 can be supplied via electrical lines 21 and 22 to first module 18. If wheel lock is detected, signals can be sent via electrical lines 23 and 24 to ABS valves 25 and 26, via which compressed air lines 9 and 12 and, thus, compressed air brake cylinders 10 and 13 can be vented. In this way, brakes 14 and 16 can be released if wheel lock is detected.

Brakes 14 and 16 can be additionally actuated for the parking brake and auxiliary-brake function via electromechanical brake actuating devices 27 and 28. Electromechanical brake actuating devices 27 and 28 are connected to first module 18 (by electrical lines 29 and 30), and can be controlled thereby. An ABS function for electromechanical brake actuating devices 27 and 28 is also integrated into first module 18.

Brake pedal device 1 and/or first module 18 can be supplied with electrical energy from a battery (not shown) via an electrical line 31. Furthermore, brake pedal device 1 is equipped with a CAN bus 32 and an electrical line 33, by which brake pedal device 1 can be connected to a diagnostic device (not shown). The brake system can be monitored by means of the diagnostic device. In addition, a signal for applying an anti-rollaway device can be generated by means of a momentary contact switch 34, or any other suitable input device, and sent by means of an electrical line 35 to brake pedal device 1 or first module 18 integrated therein.

Brake pedal device 1 or first module 18 is connected via an electrical line 37 to a second module 38. Signals can be exchanged via electrical line 37. In particular, a braking request signal from braking power transmitter 3 can be communicated to second module 38 via electrical line 37. Via electrical lines 39 and 40, electromechanical brake actuating devices 41 and 42 of brakes 43 and 44 can be controlled by second module 38 in order to brake rear wheels 45 and 46. Consequently, not only brakes 14 and 16 on at least one first axle of the vehicle but also, via electromechanical actuating devices 41 and 42, brakes 43 and 44 on at least one second axle of the vehicle can be controlled by means of the braking request signal generated by braking power transmitter 3.

In addition, an ABS function for brakes 43 and 44 is integrated into second module 38. The speeds of wheels 45 and 46 can be sensed by means of speed sensors 47 and 48 and communicated via electrical lines 49 and 50 to second module 38. If locking of wheels 45 and 46 is detected by second module 38, electromechanical brake actuating devices 41 and 42 and, thus, brakes 43 and 44 can be released by module 38, acting via electrical lines 39 and 40.

Furthermore, an electromechanical parking brake function is made available via electromechanical brake actuating devices 41 and 42. A request signal for the parking brake function of a parking brake can be generated by means of a momentary contact switch 51 and sent via an electrical line 52 to second module 38. It should be understood that any other suitable input device can be used instead of momentary contact switch 51. After it receives a signal from momentary contact switch 51, second module 38 can actuate electromechanical brake actuating devices 41 and 42 in order to apply a parking brake to rear wheels 45 and 46.

Second module 38 can request (via data line 37) the parking or auxiliary brake function of the front electromechanical brake actuating device via first module 18.

The inventive brake system embodiment depicted in FIG. 1 is further equipped with a second battery 53, by means of which second module 38 can be supplied with electrical energy via an electrical line 54. Brakes 43 and 44 can therefore be actuated independently of the functional ability of first module 18 and/or of battery 34. Even the ABS function for brakes 43 and 44 of the rear axle is independent of the function of first module 18.

Alternative embodiments of the present invention can deviate from the exemplary embodiment depicted in FIG. 1. Front wheels 15 and 17 as well as wheels 45 and 46 can each be wheels of an arbitrary axle of a vehicle—in particular, wheels 15 and 17 can also be rear wheels and wheels 45 and 46 can also be front wheels.

It is not required that first module 18 be integrated into brake pedal device 1. To the contrary, a split design is also possible. Furthermore, modules 18 and 38 can also be supplied with electrical energy by a single battery or by another common energy supply. A combined design of modules 18 and 38 is also possible. Such a combined module can then be provided separately or integrated structurally into the brake pedal design.

Electromechanical brake actuating devices 27 and 28 can be omitted. When they are present, however, they can provide an auxiliary-brake function, a parking brake function or both brake functions. A service brake function is achieved via compressed air brake cylinders 10 and 13.

If necessary, and especially when wheels 15 and 17 are rear wheels, pneumatically operated brake cylinders 10 and 13 can also be constructed as combination spring-actuated/diaphragm brake cylinders to additionally provide a parking brake function. Compressed air brake cylinders 10 and 13 are then equipped with a diaphragm part, which is pneumatically in communication with the service brake system, and also with a spring actuator part, to which compressed air can be admitted via separate compressed air lines.

Electromechanical brake actuating devices 41 and 42 provide at least one service brake function. Furthermore, and especially when wheels 45 and 46 are rear wheels, electromechanical brake actuating devices 41 and 42 can additionally provide a parking brake function. As an example, a parking brake function is achieved via one of the modes of actuation, or, in other words, either electromechanically or electro-pneumatically/pneumatically, alone or in a combination of these modes of operation.

In an embodiment of the present invention deviating from the exemplary embodiment according to FIG. 1, a pressure is modulated in direct pneumatic manner in response to actuation of brake pedal 2. The pneumatically actuatable brake cylinders of the vehicle are actuated by means of this pressure, and the braking request signal for actuation of the electromechanically actuatable brakes of the second axle of the vehicle is generated from signals of pressure sensors (not shown) located in compressed air lines 8 and 11.

Figure 2:
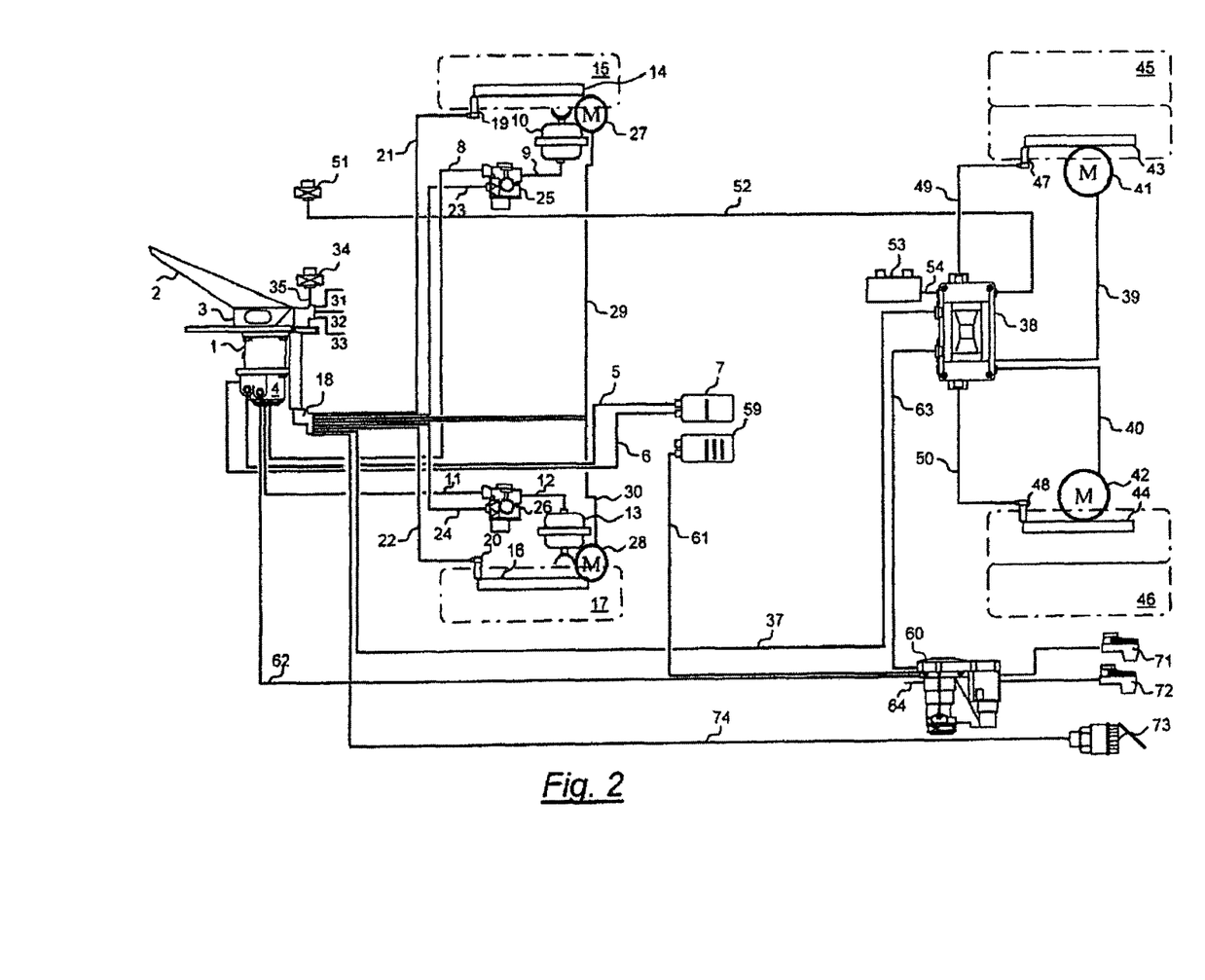
FIG. 2 is a simplified schematic diagram of a hybrid service brake system for braking a vehicle train (including a tractor and a trailer) in accordance with another exemplary embodiment of the present invention, the system having electro-pneumatically (or pneumatically as well as electromechanically) actuatable brakes on the front axle of the tractor and exclusively electromechanically actuatable brakes on the rear axle of the tractor.

FIG. 2 schematically depicts an exemplary embodiment of the inventive brake system for use in a vehicle train comprising a tractor and a trailer, with electro-pneumatically actuatable brakes on the front axle of the tractor as well as electromechanically actuatable brakes both on the front axle and on the rear axle of the tractor. In contrast to the embodiment depicted in FIG. 1, the inventive brake system embodiment depicted in FIG. 2 is additionally equipped with a compressed air reservoir tank 59, which supplies compressed air for a trailer. Via a compressed air line 61, a trailer control valve 60 is in communication with compressed air reservoir tank 59. An air pressure modulated in valve unit 4 passes via a compressed air line 62 to trailer control valve 60. Trailer control valve 60 is further equipped with two ports for electrical lines 63 and 64. Via electrical line 63, the trailer control valve is electrically connected to second module 38, and control signals can be exchanged between second module 38 and trailer control valve 60.

Trailer control valve 60 supplies the modulated air pressure as well as the reservoir compressed air to the trailer via compressed air ports 71 and 72. A coupled trailer with pneumatically actuatable brakes can be braked by means of compressed air supplied by compressed air ports 71 and 72.

For coupling and braking a trailer having electromechanically actuatable brakes, the brake system depicted in FIG. 2 is additionally equipped with an electrical plug-in port 73, which is connected to first module 18 via an electrical line 74. A braking request signal for actuation of brakes of the trailer can be supplied to the trailer via electrical line 74 and electrical plug-in port 73. If the trailer is equipped with electromechanically actuatable brakes, it can be braked via these electromechanical brakes in response to an electrical signal supplied via plug-in port 73.

Figure 3:
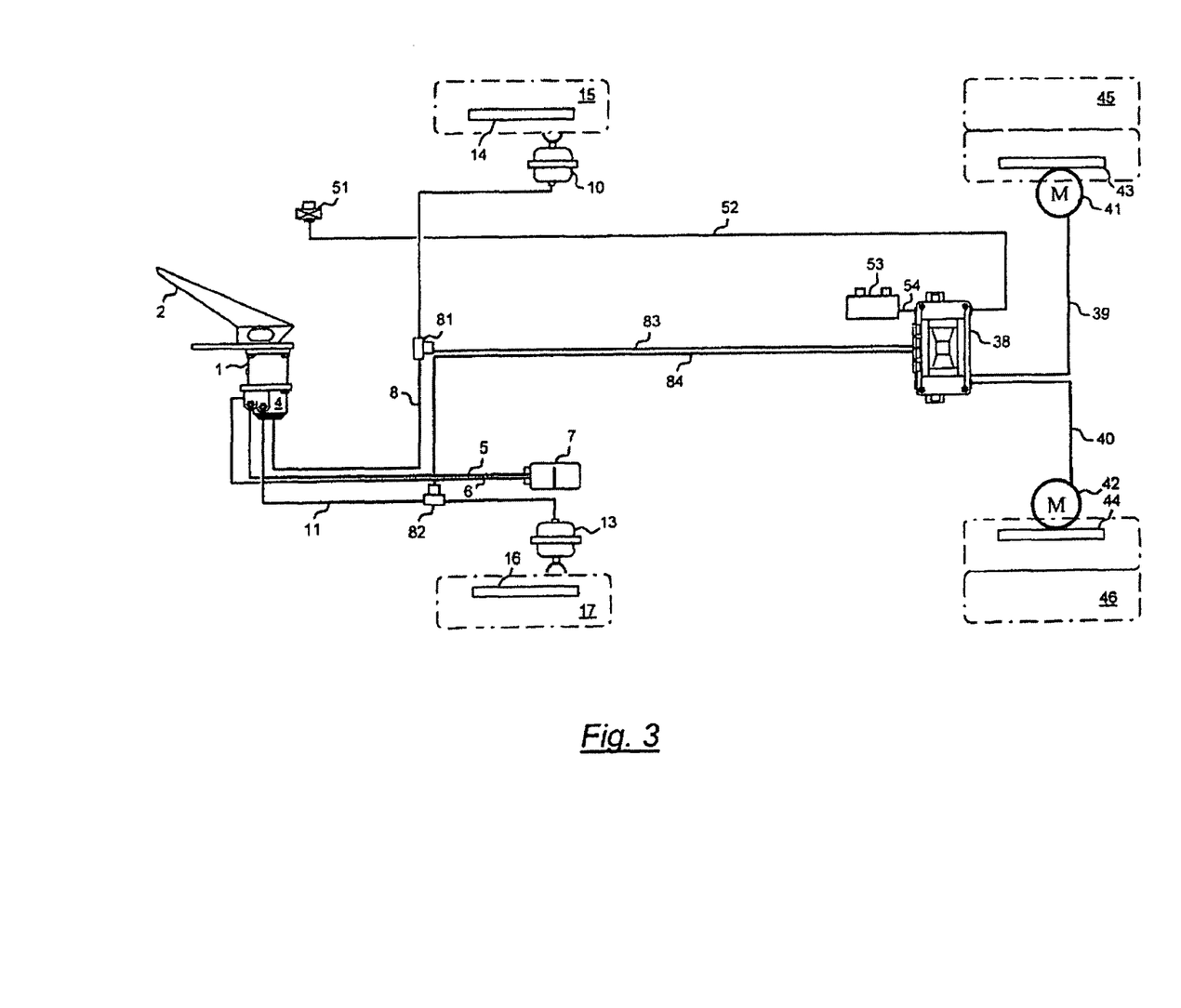
FIG. 3 is a simplified schematic diagram of a hybrid service brake system in accordance with a further exemplary embodiment of the present invention having pneumatically actuatable brakes on the front axle of the vehicle and exclusively electromechanically actuatable brakes on the rear axle of the vehicle.

FIG. 3 schematically depicts another exemplary embodiment of the inventive brake system. In this embodiment, the brake system is equipped with pneumatically actuatable brakes on the front axle as well as exclusively electromechanically actuatable brakes on the rear axle.

In brake pedal device 1, a pneumatic pressure is modulated in direct pneumatic manner by means of valve unit 4 in response to actuation of brake pedal 2. Pressurized fluid from compressed air reservoir tank 7 is supplied to brake pedal device 1 or to valve unit 4 disposed therein via compressed air lines 5 and 6. Compressed air cylinders 10 and 13 are actuated (via compressed air lines 8 and 11) with the pneumatic pressure modulated by means of valve unit 4. Compressed air cylinders 10 and 13 actuate brakes 14 and 16 for braking front wheels 15 and 17 of the vehicle.

In the embodiment of the present invention depicted in FIG. 3, the electrical braking request signal can be generated indirectly. In particular, the pneumatic pressure modulated by valve unit 4 can be measured in compressed air lines 8 and 11 by means of pressure sensors 81 and 82. In response to the pressure measurement by means of pressure sensors 81 and 82, these pressure sensors send electrical signals via electrical lines 83 and 84 to second module 38. These electrical signals are the braking request signals, or they are signals from which one or more braking request signals can be generated by second module 38.

Second module 38 can be supplied (via an electrical line 54) with electrical energy from a battery 53. The energy supply is therefore independent of an energy supply for other electrical systems of the vehicle. Furthermore, second module 38 is connected via electrical line 52 to momentary contact switch 51 for the parking brake.

Via electrical lines 39 and 40, second module 38 controls electromechanical brake actuating devices 41 and 42 for actuation of brakes 43 and 44 and, thus, for braking or immobilizing rear wheels 45 and 46 of the vehicle.

To actuate the service brakes in response to actuation of brake pedal 2, brakes 14 and 16 are therefore actuated directly by compressed air brake cylinders 10 and 13 by means of the pressure generated in direct pneumatic manner. In contrast, brakes 43 and 44 are actuated indirectly, namely, only in response to a measurement of the pneumatic pressure in compressed air lines 8 and 11.

Figure 4:
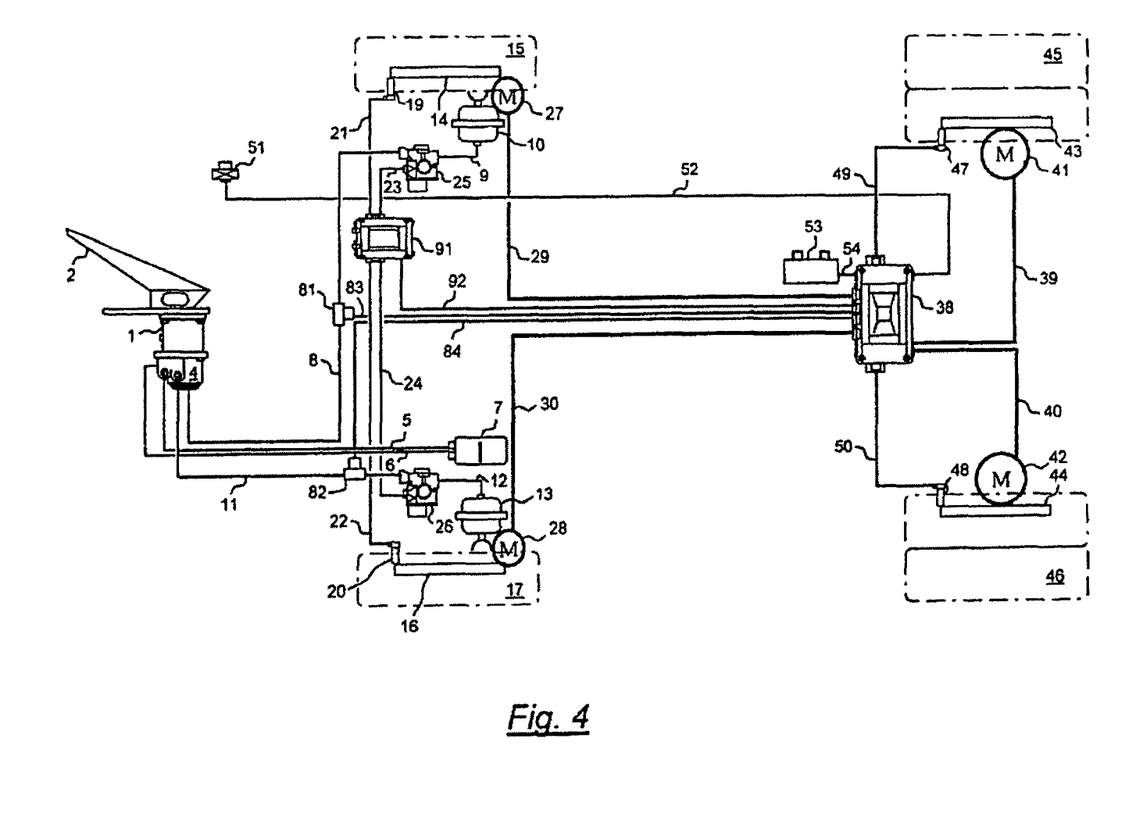
FIG. 4 is a simplified schematic diagram of a hybrid service brake system in accordance with yet another exemplary embodiment of the present invention having pneumatically and electromechanically actuatable brakes on the front axle of the vehicle and exclusively electromechanically actuatable brakes on the rear axle.

FIG. 4 schematically shows a further exemplary embodiment of the inventive brake system equipped with pneumatically and electromechanically actuatable brakes on the front axle as well as exclusively electromechanically actuatable brakes on the rear axle. The embodiment depicted in FIG. 4 is an expansion of the embodiment according to FIG. 3.

In contrast to the exemplary embodiment according to FIG. 3, brakes 14 and 16 for braking front wheels 15 and 17 can be actuated not only by means of compressed air brake cylinders 10 and 13, but also by means of electromechanical brake actuating devices 27 and 28. Activation of electromechanical brake actuating devices 27 and 28 takes place via electrical lines 29 and 30, which, in contrast to the exemplary embodiments of the present invention depicted in FIGS. 1 and 2, are connected not to a first module, but, rather, to second module 38. Thus, electromechanical brake actuating device 27, 28, 41 and 42 for braking front wheels 15 and 17 as well as rear wheels 45 and 46 can all be controlled by second module 38.

In this case, electromechanical brake actuating devices 27 and 28 can support the service brake function of pneumatically actuatable compressed air brake cylinders 10 and 13. Alternatively, devices 27 and 28 can be used as an alternative to these pneumatically actuatable compressed air brake cylinders and/or can have a parking brake function.

In further contrast to the exemplary embodiment according to FIG. 3, the exemplary embodiment according to FIG. 4 is also equipped with an ABS. To detect locking of front wheels 15 and 17 and of rear wheels 45 and 46, the brake system is therefore equipped with speed sensors 19, 20, 47 and 48. Speed sensors 47 and 48 are connected via electrical lines 49 and 50 to second module 38. Locking of rear wheels 45 and 46 can therefore be recognized by second module 38. Thereupon, brake 43 or 44 of locked rear wheel 45 or 46, respectively, can be released via electrical line 39 or 40, respectively.

Brake 14 or 16 can also be released in the event of locking of front wheel 15 or 17, respectively. For this purpose, the speed information of speed sensors 19 and 20 is communicated via electrical lines 21 and 22 to an ABS module 91. Data, especially speed information and/or recognized locking of a wheel, can be exchanged between ABS module 91 and second module 38 via an electrical line 92. In this way, brake 14 or 16 actuated by means of electromechanical brake actuating device 27 or 28, respectively, upon detection of locking of respective front wheel 15 or 17, by means of speed sensor 19 or 20, respectively, can be released by second module 38 via respective electrical line 29 or 30.

To release brakes 14 or 16 applied by means of compressed air cylinder 10 or 13, respectively, in the event of locking of respective wheel 15 or 17, the inventive system is equipped with ABS module 25 or 26, respectively. Thus, compressed air lines 8 and 11 do not place valve unit 4 in direct communication with compressed air brake cylinders 10 and 13. To the contrary, valve unit 4 is in communication with compressed air brake cylinder 10 via compressed air lines 8 and 9 as well as ABS module 25 and with compressed air cylinder 13 via compressed air lines 11 and 12 as well as ABS valve 26. In this way, compressed air line 9 or 12, respectively, can be vented by means of ABS valve 25 or 26, respectively. This venting is undertaken if locking of respective front wheel 15 or 17 is detected. For this purpose, ABS valves 25 and 26 can be controlled by ABS module 91 via electrical lines 23 and 24.

In a deviation from the exemplary embodiment according to FIG. 4, ABS module 91 can also be omitted. The functionality of ABS module 91 is then integrated into second module 38. As an alternative to second module 38, it is also possible to incorporate first module 18, which is, preferably, integrated into brake pedal device 1.

Accordingly, the present invention provides a brake system that operates with only a few expensive pneumatically operated brake cylinders. The number of pressurized fluid lines, valves and ABS valves is also reduced compared with conventional brake systems. Electromechanically actuatable brakes are used, and a parking brake function, as well as an ABS function, is achieved electromechanically, and, for this purpose, electromechanical components are employed that are more cost-effective than pneumatic components. Also, the use of pneumatically actuatable brakes and electromechanically actuatable brakes as service brakes additionally reduces the danger of simultaneous failure of all service brakes.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense. For example, the features identified in the preceding description and in the claims can also be incorporated individually into the inventive brake system.

It is also to be understood that the following claims are intended to cover all of the generic and specific features of the invention herein described and all statements of the scope of the invention which, as a matter of language, might be said to fall therebetween.

What is claimed is:

1. A vehicle brake system, comprising:
at least one first axle comprising pneumatically operated brake cylinders;
at least one second axle comprising electromechanical brake actuating devices;
a brake pedal device comprising:
a brake pedal; and
pneumatically actuatable brake cylinders operable to actuate said pneumatically operated brake cylinders by compressed air, wherein said pneumatically operated brake cylinders include an electromechanically actuatable parking brake function;
said electromechanical brake actuating devices being actuatable exclusively electromechanically in response to a braking request signal generated in response to actuation of said brake pedal, wherein a pneumatic pressure of said compressed air is modulated one of indirectly and directly, and wherein hybrid use of said pneumatically operated brake cylinders and said electromechanical brake actuating devices together effects a service brake function.

2. The vehicle brake system according to claim 1, wherein said pneumatically operated brake cylinders are operable to be actuated (i) pneumatically by said pneumatically actuatable brake cylinders according to a first mode of actuation, and (ii) electromechanically according to a second mode of actuation, and wherein said service brake function on said at least one first axle is executable according to at least one of said first and second modes of actuation.

3. The vehicle brake system according to claim 2, further comprising at least one module operable to control at least one of (i) said pneumatically operated brake cylinders according to said second mode of actuation and (ii) said electromechanical brake actuating devices.

4. The vehicle brake system according to claim 1, wherein said first brakes include a pneumatically actuatable parking brake function.

5. The vehicle brake system according to claim 1, wherein said electromechanical brake actuating devices include an electromechanically actuatable parking brake function.

6. The vehicle brake system according to claim 1, wherein said brake pedal device includes a braking power transmitter operable to generate said braking request signal in response to actuation of said brake pedal, said pneumatic pressure being modulated electro-pneumatically in response to said braking request signal and also pneumatically in direct response to actuation of said brake pedal.

7. The vehicle brake system according to claim 1, wherein said brake pedal device includes a braking power transmitter operable to generate said braking request signal in response to actuation of said brake pedal, said pneumatic pressure being modulated exclusively electro-pneumatically in response to said braking request signal.

8. The vehicle brake system according to claim 1, wherein said brake pedal device includes a braking power transmitter operable to generate said braking request signal in response to actuation of said brake pedal, said pneumatic pressure being modulated exclusively pneumatically in direct response to actuation of said brake pedal.

9. The vehicle brake system according to claim 1, further comprising at least one pressure sensor constructed and arranged to measure said pneumatic pressure, said pneumatic pressure being modulated pneumatically in exclusively direct response to actuation of said brake pedal, said braking-request signal being generated based on said measured pneumatic pressure.

10. The vehicle brake system according to claim 1, further comprising a first module operable to control said pneumatically operated brake cylinders, and a second module constructed and arranged to control said electromechanical brake actuating devices.

11. The vehicle brake system according to claim 10, further comprising a first battery for supplying said first module with electrical energy, and a second battery for supplying said second module with electrical energy.

12. The vehicle brake system according to claim 10, wherein said first module is structurally integrated into said brake pedal device.

13. The vehicle brake system according to claim 1, further comprising at least one speed sensor operable to detect a locking wheel of said vehicle, said pneumatically operated brake cylinders and said electromechanical brake actuating devices including an electromechanical anti-lock braking function for automatically releasing one of said pneumatically operated brake cylinders and said electromechanical brake actuating devices corresponding to said locking wheel.

14. The vehicle brake system according to claim 13, further comprising a first module operable to control said pneumatically operated brake cylinders, and a second module operable to control said electromechanical brake actuating devices, and wherein said anti-lock braking function is controlled by respective ones of said first and second modules corresponding to said pneumatically operated brake cylinders and said electromechanical brake actuating devices.

15. The vehicle brake system according to claim 1, wherein said at least one first axle is a front axle of said vehicle and said at least one second axle is a rear axle of said vehicle.

16. The vehicle brake system according to claim 15, further comprising at least one further first axle of said vehicle and at least one further second axle of said vehicle, said at least one further first axle being a rear axle of said vehicle and said at least one further second axle being a front axle of said vehicle.

17. The vehicle brake system according to claim 1, wherein said at least one first axle is a rear axle of said vehicle and said at least one second axle is a front axle of said vehicle.

18. The vehicle brake system according to claim 17, further comprising at least one further first axle of said vehicle and at least one further second axle of said vehicle, said at least one further first axle being a front axle of said vehicle and said at least one further second axle being a rear axle of said vehicle.

19. The vehicle brake system according to claim 1, further comprising a trailer coupled to said vehicle, said trailer including brakes, said pneumatic pressure of said compressed air being modulated for actuation of said trailer brakes, a first port constructed and arranged to permit passage of said compressed air from a compressed air reservoir to said trailer for actuation of said trailer brakes, and a second port constructed and arranged to permit passage of said compressed air including said modulated pneumatic pressure for actuation of said trailer brakes.

20. The brake system according to claim 1, further comprising a trailer including electromechanically actuatable brakes coupled to said vehicle, and an electrical plug-in port operable to permit passage of an electrical actuating signal for actuation of said electromechanically actuatable brakes of said trailer.

\* \* \* \* \*